US009725112B2

(12) United States Patent
Kitazume (10) Patent No.: US 9,725,112 B2
(45) Date of Patent: Aug. 8, 2017

(54) ELECTRIC POWER STEERING APPARATUS (71) Applicant: NSK LTD., Tokyo (JP)

(72) Inventor: Tetsuya Kitazume, Maebashi (JP)

(73) Assignee: NSK LTD., Shinagawa-ku, Tokyo (JP)

( * ) Notice: Subject to any disclaimer, the term of this patent is extended or adjusted under 35 U.S.C. 154(b) by 0 days.

(21) Appl. No.: 14/651,949

(22) PCT Filed: Sep. 25, 2014

(86) PCT No.: PCT/JP2014/075448
§ 371 (c)(1),
(2) Date: Jun. 12, 2015

(87) PCT Pub. No.: WO2015/122043
PCT Pub. Date: Aug. 20, 2015

(65) Prior Publication Data
US 2016/0347357 A1    Dec. 1, 2016

(30) Foreign Application Priority Data

Feb. 12, 2014    (JP) ................................ 2014-024669

(51) Int. Cl.
*B62D 5/04*    (2006.01)
*B62D 6/00*    (2006.01)
(Continued)

(52) U.S. Cl.
CPC ............ *B62D 5/0466* (2013.01); *B62D 6/00* (2013.01); *B62D 5/04* (2013.01); *B62D 5/0463* (2013.01);
(Continued)

(58) Field of Classification Search
CPC ...... B62D 5/0466; B62D 5/04; B62D 5/0472; B62D 5/0463; B62D 6/00; B62D 6/008; B62D 6/10; B62D 6/04; B62D 15/0235
(Continued)

(56) References Cited

U.S. PATENT DOCUMENTS

2006/0090952 A1*    5/2006    Ito ..................... B62D 15/0235
                                                                180/446
2009/0271069 A1*   10/2009    Yamamoto ............ B62D 6/008
                                                                701/41
(Continued)

FOREIGN PATENT DOCUMENTS

JP    2007-99053 A    4/2007
JP    2007-261550 A   10/2007
(Continued)

OTHER PUBLICATIONS

International Search Report mailed Dec. 22, 2014 for International Application No. PCT/JP2014/075448.
(Continued)

*Primary Examiner* — Khoi Tran
*Assistant Examiner* — Robert Nguyen
(74) *Attorney, Agent, or Firm* — Sughrue Mion, PLLC (57) ABSTRACT

[Problem]
An object of the present invention is to provide an electric power steering apparatus that is capable of positively returning a steering wheel to a neutral point in such a running state as to return to a going straight state by calculating a return control current corresponding to a steering angle and a steering speed and compensating a current command value.
[Means for solving the problem]
An electric power steering apparatus comprising: a steering wheel return control section that calculates a return control current with a steering angle, a vehicle speed and a steering speed, and drives a motor with a compensated current command value left by the subtraction of the return control current from a current command value, wherein the steering wheel return section comprises a base-return control current calculating section that calculates a base-return control current, a target steering speed calculating section that calculates a target steering speed, a return control gain
(Continued)

calculating section that calculates a deviation between the target steering speed and the steering speed, performs coding, and at a same time calculates a return control gain by using at least two control calculations among a P-control calculation, an I-control calculation and a D-control calculation, a limiter that limits a maximum value of the return control gain, and a correcting section that corrects the base-return control current with an output gain of the limiter and outputs the return control current.

17 Claims, 8 Drawing Sheets (51) Int. Cl.
  *B62D 6/04* (2006.01)
  *B62D 15/02* (2006.01)
  *B62D 6/10* (2006.01)

(52) U.S. Cl.
  CPC ............ *B62D 5/0472* (2013.01); *B62D 6/008* (2013.01); *B62D 6/04* (2013.01); *B62D 6/10* (2013.01); *B62D 15/0235* (2013.01)

(58) Field of Classification Search
  USPC .............................................. 701/41; 180/466
  See application file for complete search history.

(56) References Cited

U.S. PATENT DOCUMENTS

| | | | |
|---|---|---|---|
| 2015/0166100 A1* | 6/2015 | Kim ..................... | B62D 5/0466 |
| | | | 701/42 |
| 2015/0210310 A1* | 7/2015 | Akatsuka ................. | B62D 5/04 |
| | | | 701/41 |
| 2016/0318546 A1* | 11/2016 | Lee ..................... | B62D 5/0466 |

FOREIGN PATENT DOCUMENTS

| | | |
|---|---|---|
| JP | 2007-296900 A | 11/2007 |
| JP | 2009-67073 A | 4/2009 |
| JP | 2009-149170 A | 7/2009 |
| JP | 4872298 B2 | 2/2012 |
| JP | 2012106678 B1 * | 6/2012 |

OTHER PUBLICATIONS

Written Opinion for PCT/JP2014/075448 dated Dec. 22, 2014 [PCT/ISA/237].

* cited by examiner

FIG.1

PRIOR ART

ELECTRIC POWER STEERING APPARATUS

CROSS REFERENCE TO RELATED APPLICATIONS

This application is a National Stage of International Application No. PCT/JP2014/075448, filed on Sep. 25, 2014, which claims priority from Japanese Patent Application No. 2014-024669, filed on Feb. 12, 2014, the contents of all of which are incorporated herein by reference in their entirety.

TECHNICAL FIELD

The present invention relates to an electric power steering apparatus that calculates a current command value based on a steering torque and a vehicle speed, drives a motor based on the current command value, and performs assist control of a steering system by a drive control of the motor, and in particular to an electric power steering apparatus that is capable of positively returning a steering handle (a steering wheel) to a neutral point in such a running state as to return to a going straight state by compensating the current command value with a return control current corresponding to a steering angle.

BACKGROUND ART

An electric power steering apparatus which performs an assist control of a steering apparatus of a vehicle by means of rotational torque of a motor, applies driving force of the motor as an assist load to a steering shaft or a rack shaft by means of a transmission mechanism such as gears or a belt through a reduction mechanism. In order to accurately generate an assist torque (steering assist torque), such a conventional electric power steering apparatus performs a feedback control of a motor current. The feedback control adjusts a voltage supplied to the motor so that a difference between a current command value and a detected motor current value becomes small, and the adjustment of the voltage supplied to the motor is generally performed by an adjustment of a duty ratio of a PWM (Pulse Width Modulation) control.

Figure 1:
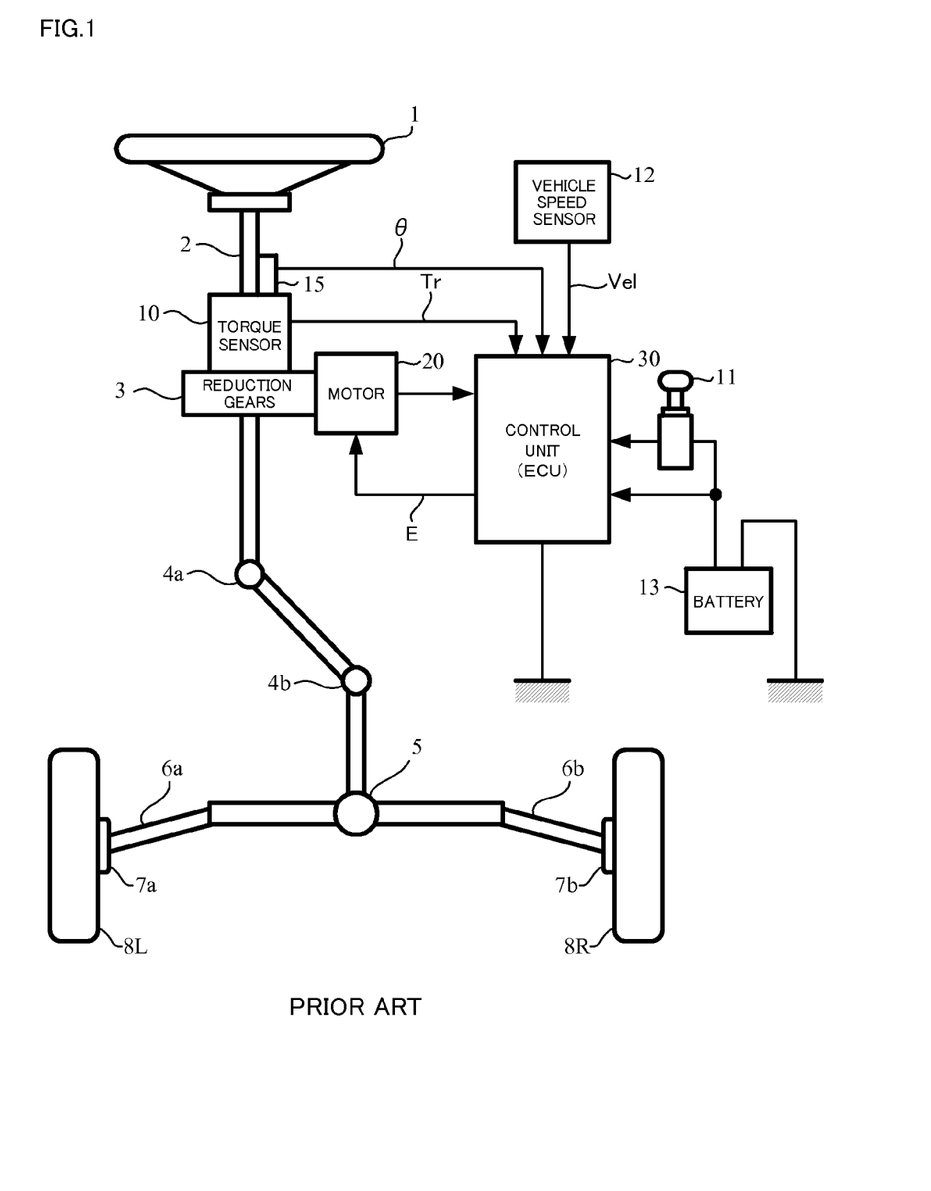
FIG. 1 is a configuration diagram illustrating a general outline of an electric power steering apparatus.

A general configuration of a conventional electric power steering apparatus will be described with reference to FIG. 1. As shown in FIG. 1, a column shaft (a steering shaft or a steering wheel shaft) 2 connected to a steering wheel 1 is connected to steered wheels 8L and 8R through reduction gears 3, universal joints 4a and 4b, a rack and pinion mechanism 5, and tie rods 6a and 6b, further via hub units 7a and 7b. Further, the column shaft 2 is provided with a torque sensor 10 for the detecting steering torque of the steering wheel 1, and a motor 20 for assisting the steering force of the steering wheel 1 is connected to the column shaft 2 through the reduction gears 3. Electric power is supplied to a control unit (ECU) 30 for controlling the electric power steering apparatus from a battery 13, and an ignition key signal is inputted into the control unit 30 through an ignition key 11. Further, the column shaft 2 is provided with a steering angle sensor 15 for detecting a steering angle, and the steering angle θ detected by the steering angle sensor 15 is inputted into the control unit 30. The control unit 30 calculates a current command value of an assist (steering assist) command based on the steering torque Tr detected by the torque sensor 10 and a vehicle speed Vel detected by a vehicle speed sensor 12, and controls a current supplied to the motor 20 based on a voltage control value E obtained by performing compensation and so on with respect to the calculated current command value. Moreover, it is also possible to receive the vehicle speed Vel from a CAN (Controller Area Network) and so on.

Figure 2:
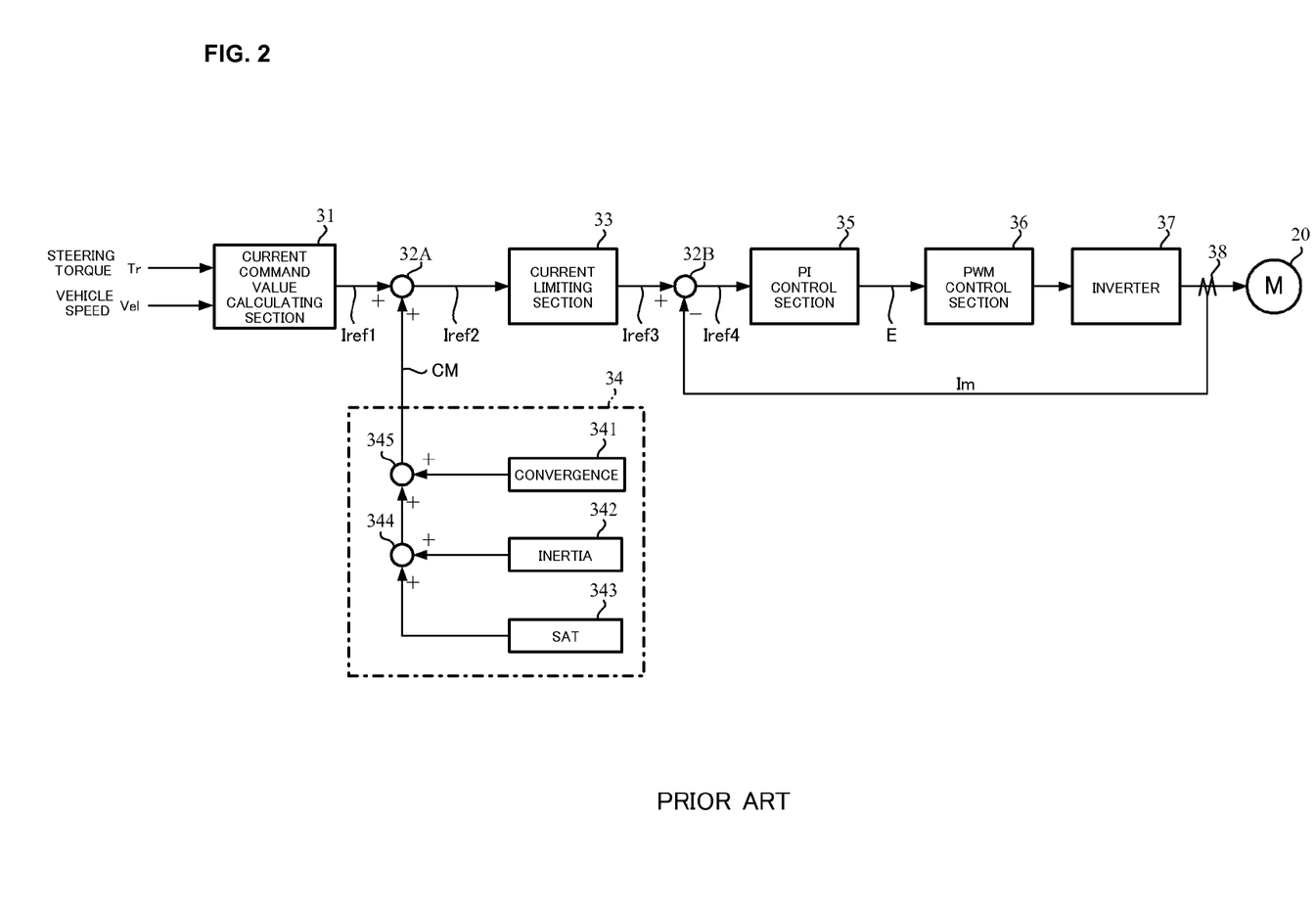
FIG. 2 is a block configuration diagram showing one example of a control unit (ECU)

The control unit 30 mainly comprises a CPU (including an MPU and an MCU), and general functions performed by programs within the CPU are shown in FIG. 2.

Functions and operations of the control unit 30 will be described with reference to FIG. 2. As shown in FIG. 2, the steering torque Tr detected by the torque sensor 10 and the vehicle speed Vel detected by the vehicle speed sensor 12 are inputted into a current command value calculating section 31 that calculates the current command value Iref1. The current command value calculating section 31 calculates the current command value Iref1, which is a control target value of a current supplied to the motor 20, based on the inputted steering torque Tr and the inputted vehicle speed Vel by means of an assist map and so on. The current command value calculating section 31 may further comprise a phase compensating section for improving a stability of a steering system, a center-responsibility improving section that performs a maintenance of the stability in a dead zone of an assist characteristic and a compensation of static friction, a robust stabilization compensating section that eliminates a resonance frequency peak of a resonator system comprising an inertial element and a spring element included in the detected torque and compensates a phase shift of a resonance frequency to inhibit the stability and the responsibility of a control system, and so on.

The current command value Iref1 is inputted into a current limiting section 33 through an adding section 32A, a current command value Iref3 of which a maximum current is limited is inputted into a subtracting section 32B, a deviation Iref4 (=Iref3−Im) between the current command value Iref3 and a motor current value Im that is fed back is calculated, and the deviation Iref4 is inputted into a PI control section 35 that is a current control section for improving an characteristic of a steering action. The voltage control value E of which a characteristic is improved by the PI control section 35 is inputted into a PWM control section 36, moreover, a motor 20 is PWM-driven through an inverter 37 as a driving section. The current value Im of the motor 20 is detected by a motor current detector 38, and is fed back to the subtracting section 32B. FETs are used as driving elements within the inverter 37, which comprises a bridge circuit of FETs. Moreover, the current limiting section 33 is not essential.

Further, a compensated signal CM from a compensating section 34 is added to the adding section 32A, which performs compensation of a system by adding the compensated signal CM and improves convergence, an inertial characteristic and so on. The compensating section 34 adds a self aligning torque (SAT) 343 and the inertia 342 by an adding section 344, moreover, adds the convergence 341 to an addition result by an adding section 345, and makes the compensated signal CM of the addition result of the adding section 345.

In such the electric power steering apparatus, the action is obstructed by the friction of the reduction gears and the rack-and-pinion mechanism for transmitting the assist force, the steering wheel is not returned to the neutral point, and the vehicle may be hard to become the going straight state, although the vehicle is in such a running state as to be wanted to return to the going straight state.

As a prior art for controlling an assist characteristic at the time of returning the steering wheel, there is a steering wheel return control disclosed in the publication of Japanese Patent No. 4407935 B2 (Patent Document 1). A control structure disclosed in Patent Document 1 calculates a target steering speed from the steering angle, the vehicle speed and the steering torque, and calculates a compensation current depending on a deviation between the actual steering speed and the target steering speed.

THE LIST OF PRIOR ART DOCUMENTS

Patent Documents

Patent Document 1: Japanese Patent No. 4407935 B2
Patent Document 2: Japanese Published Unexamined Patent Application No. 2007-99053 A

SUMMARY OF THE INVENTION

Problems to be Solved by the Invention

In steering wheel return control, the target steering speed calculated from the steering angle is generally set in such a manner that the target steering speed becomes higher, the larger the steering angle becomes. However, for example, during the turn operation a driver tries to steer so that an actual steering speed is slow in the area where the steering angle is large. At this time, because a deviation between the target steering speed and the actual steering speed becomes large, an output of the steering wheel return control also tends to become large, and the driver feels a vehicle characteristic that a feeling of steering wheel return is strong. Further, because the compensation current is outputted due to the deviation at the time of the turn steering wheel, a compensation output also changes depending on the steering speed. Consequently, the driver feels a pseudo viscous friction, but it is not necessary to get a feeling of the viscous friction by the steering wheel return control at the time of the turn steering wheel.

The steering wheel return control in Patent Document 1 avoids the above-mentioned problem by slowing the target steering speed depending on the steering torque of the driver, but the steering torque may temporarily change large or small in a case of a quick steering and so on. In such the case there is a problem that an uncomfortable feeling of the steering is felt because sudden change of the compensation quantity occurs.

Further, an art of the steering wheel return control is also disclosed in Japanese Published Unexamined Patent Application No. 2007-99053 A (Patent Document 2), but there is a problem that it is impossible to control the steering speed because the art does not use the deviation between the target steering speed and the actual steering speed for the steering wheel return control.

The present invention has been developed in view of the above-described circumstances, and an object of the present invention is to provide an electric power steering apparatus that is capable of positively returning the steering wheel to the neutral point in such a running state as to return to a going straight state by calculating a return control current corresponding to the steering angle and the steering speed and compensating the current command value.

Means for Solving the Problems

The present invention relates to an electric power steering apparatus that calculates a current command value based on a steering torque and a vehicle speed, drives a motor based on said current command value, and performs assist control of a steering system by drive-control of said motor, the above-described object of the present invention is achieved by that comprising: a steering wheel return control section that calculates a return control current with a steering angle, said vehicle speed and a steering speed, wherein said electric power steering apparatus drives said motor with a compensated current command value left by the subtraction of said return control current from said current command value, and wherein said steering wheel return section comprises a base-return control current calculating section that calculates a base-return control current based on said steering angle and said vehicle speed, a target steering speed calculating section that calculates a target steering speed based on said steering angle and said vehicle speed, a return control gain calculating section that calculates a deviation between said target steering speed and said steering speed, performs coding, and calculates a return control gain by using at least two control calculations among a P-control calculation, an I-control calculation and a D-control calculation, a limiter that limits a maximum value of said return control gain, and a correcting section that corrects said base-return control current with an output gain of said limiter and outputs said return control current.

Further, the above-described object of the present invention is more effectively achieved by that wherein said return control gain calculating section comprises a subtracting section that calculates a deviation between said target steering speed and said steering speed, an inverting section that inverts said deviation, a coding section that obtains a positive or negative sign of said steering angle, a multiplying section that multiplies an inverted deviation from said inverting section with said sign, and a control calculating section that outputs said return control gain by performing the P-control calculation and the I-control calculation of an output from said multiplying section and adding an output of the P-control calculation and an output of the I-control calculation; or wherein said return control gain calculating section comprises a subtracting section that calculates a deviation between said target steering speed and said steering speed, an inverting section that inverts said deviation, a coding section that obtains a positive or negative sign of said steering angle, a control calculating section that outputs said return control gain by performing the P-control calculation and the I-control calculation of an output from said inverting section and adding an output of the P-control calculation and an output of the I-control calculation, and a multiplying section that multiplies said return control gain with said sign; or wherein said return control gain calculating section comprises a subtracting section that calculates a deviation between said target steering speed and said steering speed, an inverting section that inverts said deviation, a coding section that obtains a positive or negative sign of said steering angle, a control calculating section that outputs said return control gain by performing the P-control calculation, the I-control calculation and the D-control calculation of an output from said inverting section and adding an output of the P-control calculation, an output of the I-control and an output of the D-control calculation, and a multiplying section that multiplies said return control gain with said sign; or wherein said return control gain calculating section comprises a subtracting section that calculates a deviation between said target steering speed and said steering speed, a first inverting section that inverts said deviation, a coding section that obtains a positive or negative sign of said steering angle, a second inverting section that inverts said steering speed, a control calculating section that outputs said return control gain by performing the P-control calculation and the I-control calculation of an output from said first inverting section, performing the D-control calculation of an output from said second inverting section, subtracting an output of said D-control calculation from an output of said I-control calculation and adding an output of said P-control to a result of a subtraction, and a multiplying section that multiplies said return control gain with said sign; or wherein said return control gain calculating section comprises a subtracting section that calculates a deviation between said target steering speed and said steering speed, a first inverting section that inverts said deviation, a coding section that obtains a positive or negative sign of said steering angle, a second inverting section that inverts said steering speed, a control calculating section that outputs said return control gain by performing the I-control calculation of an output from said first inverting section, performing the P-control calculation and the D-control calculation of an output from said second inverting section and subtracting an addition result of an output of said P-control calculation and an output of said D-control calculation from an output of said I-control, and a multiplying section that multiplies said return control gain with said sign; or wherein said return control gain calculating section comprises a subtracting section that calculates a deviation between said target steering speed and said steering speed, a first inverting section that inverts said deviation, a coding section that obtains a positive or negative sign of said steering angle, a first multiplying section that multiplies an inverted deviation from said first inverting section with said sign, a second inverting section that inverts said steering speed, a second multiplying section that multiplies an inverted steering speed from said second inverting section with said positive or negative sign, and a control calculating section that outputs said return control gain by performing the I-control calculation of an output from said first multiplying section, performing the P-control calculation of an output from said second multiplying section and subtracting an output of said P-control calculation from an output of said I-control calculation; or wherein said return control gain calculating section comprises a subtracting section that calculates a deviation between said target steering speed and said steering speed, a first inverting section that inverts said deviation, a coding section that obtains a positive or negative sign of said steering angle, a second inverting section that inverts said steering speed, a control calculating section that outputs said return control gain by performing the I-control calculation of an output from said first inverting section, performing the P-control calculation of an output from said second inverting section, subtracting an output of said P-control calculation from an output of said I-control calculation, and a multiplying section that multiplies said return control gain with said sign; or wherein said maximum value is 1.0, and said correcting section is a multiplying section; or wherein said base-return control current calculating section is a vehicle-speed sensitive type, and has a parabolic characteristic of point symmetry that the base-return control current gradually increases in positive and negative directions as an absolute value of said steering angle increases from 0, and the base-return control current gradually decreases when said absolute value exceeds a predetermined value; or wherein said target steering speed calculating section is a vehicle-speed sensitive type, and has a characteristic of point symmetry that the target steering speed gradually increases in negative and positive directions as an absolute value of said steering angle increases from 0.

Effects of the Invention

According to the electric power steering apparatus of the present invention, the apparatus calculates a gain of the steering wheel return control by means of a calculation using at least two control calculations among a P-control calculation (Proportional control calculation), an I-control calculation (Integral control calculation) and a D-control calculation (Differential control calculation) depending on the deviation between the target steering speed and the actual steering speed, and calculates the compensation current by correcting (multiplying) a base-return control current corresponding to the steering angle by means of the gain. Because the base-return control current depends on the steering angle, the absolute value of the final return control current also becomes small on condition that the absolute value of the base-return control current is small even if the deviation between the target steering speed and the actual steering speed is large, so that it is possible to set a moderate return control current. Besides, because the return control current increases or decreases depending on the deviation between the target steering speed and the actual steering speed, it is possible to perform a smooth steering wheel return control following the target steering speed.

Further, in the turn steering wheel, the return control gain is accumulated with an integral gain, but the present invention can make the setting to limit the output to the base-return control current by limiting (the maximum value=1.0) the value of the return control gain. Therefore, the return control current corresponding to the steering angle is outputted at the time of the turn steering wheel, and it is possible to give the driver not a feeling of viscosity of resistance corresponding to a speed but a feeling of reaction force of the resistance corresponding to an angle.

MODE FOR CARRYING OUT THE INVENTION

The present invention is an electric power steering apparatus that calculates a current command value based on a steering torque and a vehicle speed, drives a motor based on the current command value and performs an assist control of a steering system by a drive control of the motor, calculates a return control gain depending on a deviation between a target steering speed and an actual steering speed by means of a control calculation such as a PI-control calculation (Proportional Integral control calculation) and so on, and calculates a return control current for compensation of the current command value by correcting (multiplying) a base-return control current corresponding to a steering angle (vehicle speed) by means of the return control gain. Because the base-return control current depends on the steering angle, the absolute value of the final return control current also becomes small on condition that the absolute value of the base-return control current is small even if the deviation between the target steering speed and the actual steering speed is large, so that it is possible to set a moderate return control current. Besides, because the volume of the return control current increases or decreases depending on the deviation between the target steering speed and the actual steering speed, it is possible to perform a smooth steering wheel return control following the target steering speed.

Further, in the turn steering wheel, a value of the return control gain is accumulated with an integral gain, but it is possible to make the setting to limit the output to the base-return control current by limiting the maximum value of the return control gain to "1.0". Therefore, the return control current corresponding to the steering angle is outputted at the time of the turn steering wheel, and it is possible to give a driver not a feeling of viscosity of resistance corresponding to a speed but a feeling of a reaction force of the resistance corresponding to the steering angle.

Hereinafter, an embodiment of the present invention will be described with reference to the accompanying drawings.

Figure 3:
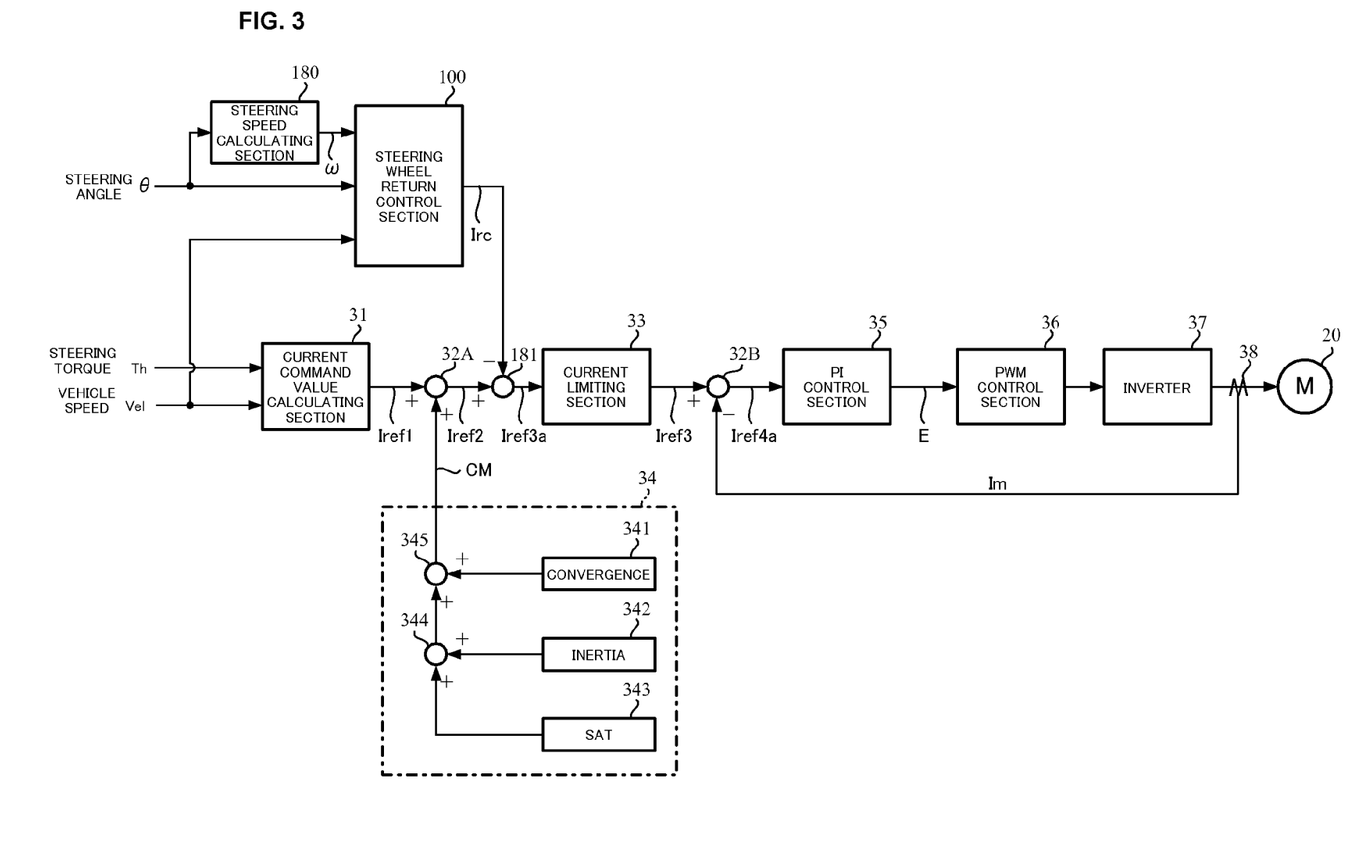
FIG. 3 is a block diagram showing a configuration example of an electric power steering apparatus of the present invention.

FIG. 3 is a block diagram showing a configuration example of the electric power steering apparatus according to the present invention as corresponding to FIG. 2. The present invention is provided with a steering wheel return control section 100 that inputs a steering angle θ, an steering speed ω and a vehicle speed Vel, calculates a return control current Irc and outputs the return control current Irc, and is also provided with a steering speed calculating section 180 that calculates (differentiates) the steering speed ω from the steering angle θ and a subtracting section 181 that subtracts (corrects) the return control current Irc from a current command value Iref2 and outputs a compensated current command value Iref3a.

Figure 4:
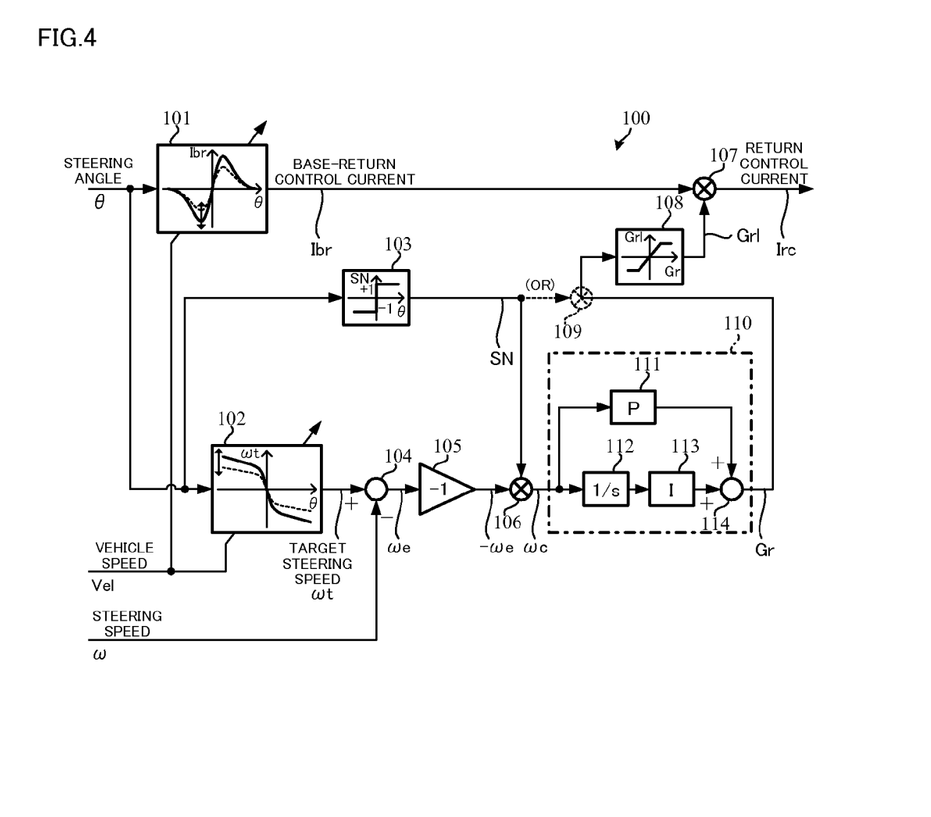
FIG. 4 is a block diagram showing a configuration example of a steering wheel return control section.
Figure 5:
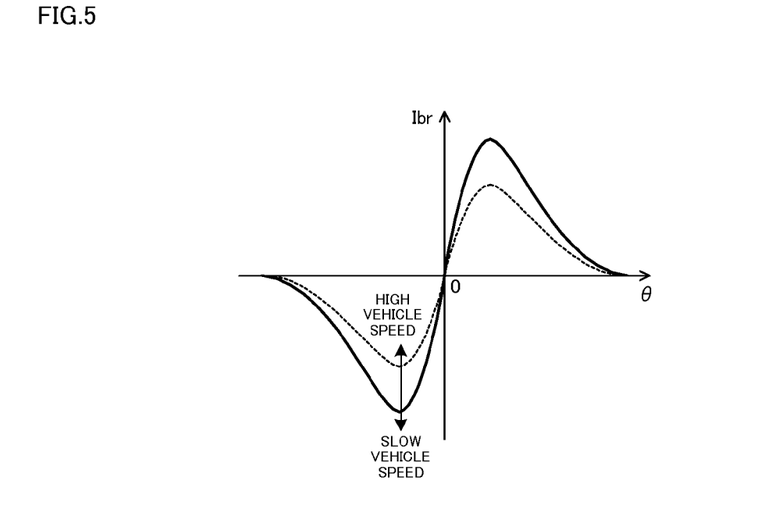
FIG. 5 is a characteristic diagram showing a characteristics example of a base-return control current calculating section.
Figure 6:
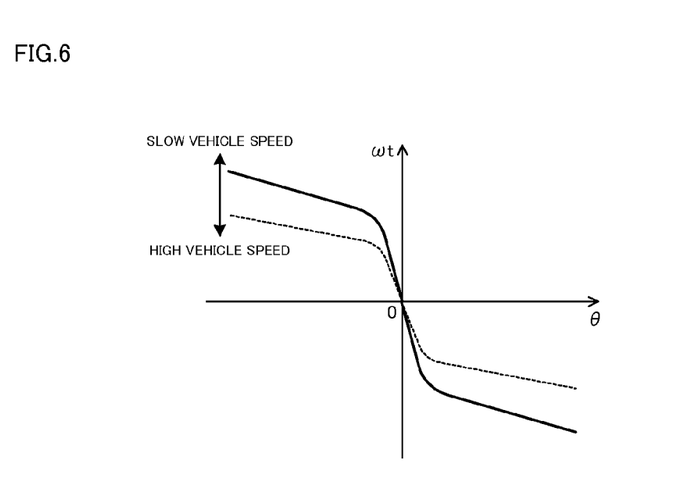
FIG. 6 is a characteristic diagram showing a characteristics example of a target steering speed calculating section.

The steering wheel return control section 100 is configured as shown in FIG. 4, the steering angle θ is inputted into a base-return control current calculating section 101 and a target steering speed calculating section 102, the vehicle speed Vel is also inputted into the base-return control current calculating section 101 and the target steering speed calculating section 102, and both the base-return control current calculating section 101 and the target steering speed calculating section 102 have a vehicle speed-sensitive characteristic. The characteristic of the base-return control current calculating section 101 is, as shown in FIG. 5, a characteristic of parabolic point symmetry that the value increases toward a positive direction (a negative direction) as the steering angle θ becomes larger (smaller) than 0 and gradually decreases when the steering angle θ exceeds a positive or a negative predetermined value. In other words, the characteristic is a parabolic characteristic of the point symmetry that the value gradually increases toward positive and negative directions as the absolute value of the steering angle θ becomes larger than 0 and gradually decreases when the absolute value exceeds the predetermined value. Further, the characteristic of the target steering speed calculating section 102 is, as shown in FIG. 6, a characteristic of point symmetry that the value gradually increases toward a negative direction (a positive direction) as the steering angle θ becomes larger (smaller) than 0. In other words, the characteristic is a characteristic of the point symmetry that the value gradually increases toward negative and positive directions as the absolute value of the steering angle θ becomes larger than 0.

A base-return control current Irc calculated in the base-return control current calculating section 101 is inputted into a multiplying section 107 as a correcting section, and a target steering speed ωt calculated in the target steering speed calculating section 102 is addition-inputted into a subtracting section 104. The steering speed ω is subtraction-inputted as an actual steering speed into the subtraction section 104, a deviation ωe between the target steering speed ωt and the steering speed ω is inputted into an inverting section 105, and an inverted deviation "−ωe" is inputted into a multiplying section 106.

Figure 7:
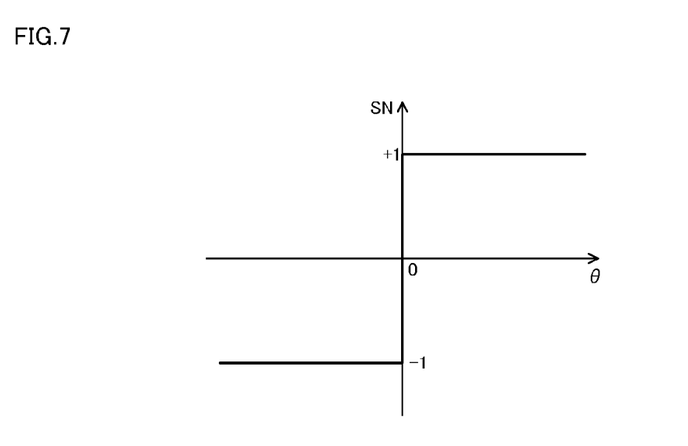
FIG. 7 is a characteristic diagram showing a characteristics example of a coding section.

Further, the steering angle θ is inputted into a coding section 103, and the coding section 103 outputs a sign SN that becomes '+1' on the positive side of the steering angle θ and becomes '−1' on the negative side as shown in FIG. 7. The sign SN is inputted into the multiplying section 106, multiplied by the inverted deviation "−ωe", and an steering speed ωc (=SN·(−ωe)) multiplied in the multiplying section 106 is inputted into a PI control calculating section 110 as a control calculating section. Moreover, a return control gain calculating section comprises the coding section 103, the subtracting section 104, the inverting section 105, the multiplying section 106 and the PI control calculating section 110.

The PI-control calculating section 110 comprises a proportional (P) calculating section 111 that proportional-control-calculates the steering speed ωc, an integral (I) calculating section 112 that integral-calculates the steering speed ωc, an integral gain section 113 that multiplies an output of the integral calculating section 112 with an integral gain I and an adding section 114 that adds an output of the proportional calculating section 111 and the integral gain section 113 and outputs a return control gain Gr. The PI-control calculating section 110 performs the control calculation for the steering speed ωc and outputs the return control gain Gr.

Figure 8:
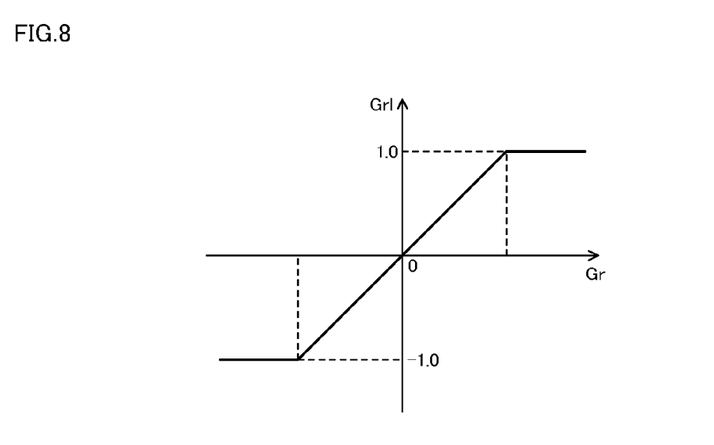
FIG. 8 is a characteristic diagram showing a characteristics example of a limiter.

A maximum output of the return control gain Gr control-calculated in the PI-control calculating section 110 is limited to "1.0" by a limiter 108 having a characteristic as shown in FIG. 8, and the return control gain Gr of which maximum output is limited to "1.0" is inputted into the multiplying section 107. The multiplying section 107 multiplies the base-return control current Ibr and the return control gain Gr, and outputs the return control current Irc that is the result of multiplication. The return control current Irc is subtraction-inputted into the subtracting section 181, and the compensated current command value Iref3a left by the return control current Irc subtracted from the current command value Iref2 is generated.

Figure 9:
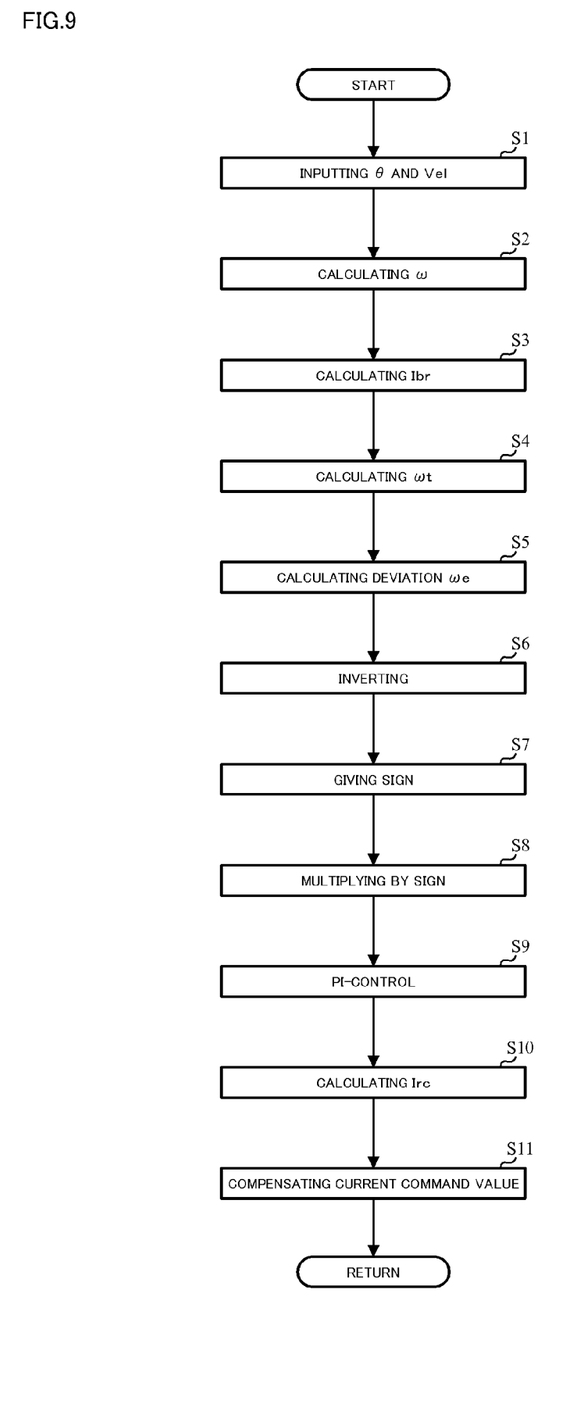
FIG. 9 is a flowchart showing an operating example of the present invention.

In such a configuration, that operating example will be described with reference to the flowchart of FIG. 9.

First, the steering angle θ from the steering angle sensor and the vehicle speed Vel from the vehicle speed sensor 12 are inputted and read (Step s1), the steering speed calculating section 180 calculates (differentiates) the steering speed ω from the steering angle θ (Step S2). Moreover, the steering angle θ and the vehicle speed Vel may be inputted from the CAN.

The base-return control current calculating section 101 calculates the return control current Irc based on the steering angle θ and the vehicle speed Vel, and inputs into the multiplying section 107 (Step S3). Further, the target steering speed calculating section 102 calculates the target steering speed ωt base on the steering angle θ and the vehicle speed Vel (Step S4), the subtracting section 104 calculates the deviation ωe between the steering speed (the actual steering speed) ω and the target steering speed ωt (Step S5), and the inverting section 105 inverts the deviation ωe and inputs the deviation "−ωe" into the multiplying section 106 (Step S6).

Further, the coding section 103 calculates a sign of the steering angle θ (Step S7), the multiplying section 106 multiplies the deviation "−ωe" with the sign SN (Step S8), and inputs the deviation ωc given the sign into the PI-control calculating section 110. The PI-control calculating section 110 performs the proportional control calculation in the proportional calculating section 111 and the integral control calculation in the integral calculating section 112 and the integral gain section 113, performs addition of the proportional control calculation and the integral control calculation in the adding section 114, and outputs the return control gain Gr from the adding section 114 (Step S9). The return control gain Gr, of which maximum value is limited to "1.0" by the limiter 108, is inputted into the multiplying section 107, which corrects (multiplies) the base-return control current Ibr with the return control gain Gr and outputs the return control current Irc (Step S10). The return control current Irc is subtraction-inputted into the subtracting section 181, the current command value Iref3a from which the return control current Irc is subtracted so as to be compensated is generated (Step S11), and hereafter the same steering control as above-mentioned is performed.

As mentioned above, the present invention calculates the base-return control current Ibr depending on the steering angle θ and the vehicle speed Vel, herewith it is possible to make the return control current Irc large in a vehicle state how an SAT (Self Aligning Torque) is small and the return of the steering wheel is bad and to make the return control current Irc small in a vehicle state how the SAT is large and the steering wheel returns. Further, the present invention does not perform the steering wheel return control in a vehicle speed range of a static steering how the steering wheel return control is not necessary and so on.

Because the target steering speed ωt is a target speed in doing steering wheel return, it is defined that the steering angle θ is positive and the target steering speed ωt is negative as shown in FIG. 6. When the steering speed (matches with the steering angle θ by inverting the sign of the deviation ωe and multiplying with the sign SN of the steering angle θ, the steering speed ωc after given the sign is positive in returning at faster steering speed than the target steering speed ωt and is negative in returning at slower steering speed than the target steering speed ωt. The PI control calculating section 110 inputs the steering speed ωc after given the sign and calculates the return control gain Gr, then the return control gain Gr increases toward a negative direction as the steering speed ω is faster than the target steering speed ωt and increases toward a positive direction as the steering speed ω is slower than the target steering speed ωt. The return control current Irc is calculated by multiplying and correcting the base-return control current Ibr with the return control gain Gr. The return control current Irc varies large or small (increases or decreases) depending on the deviation ωe, a return assist torque for returning to the center (neutral point) increases in slower steering than the target steering speed ωt, and the assist torque decreases in slower steering than the target steering speed ωt or is outputted as brake torque for making the speed slow.

It is possible for the present invention to achieve the smooth steering wheel return because of controlling the steering wheel to return at the target steering speed ωt because of calculating the return control gain Gr from the deviation ωe in the PI-control calculating section 110 and making the return control current Irc vary large or small. Moreover, after the maximum value of the return control gain Gr is limited by the limiter 108, the base-return control current Ibr is multiplied with the return control gain Gr, and the upper limit of the limiter 108 is set one time. In the case of performing the turn steering wheel, the steering speed ω is positive when the steering angle θ is positive. At that time the target steering speed ωt is negative, and the deviation ωe necessarily becomes negative because of subtracting the positive steering speed ω from the negative target steering speed ωt. The deviation after given the sign is inverted, and becomes positive because multiplied with the sign SN of the steering angle θ. Accordingly, the integral value of the PI-control calculating section 110 accumulates toward a positive direction. By providing a latter part of the PI-control calculation with the limiter 108, the return control gain Gr is fixed at the upper limit (=1.0). Hereby, the base-return control current Ibr is just outputted as the return control current Irc. Herewith, the return control current Irc is outputted as a compensation quantity corresponding to the steering angle θ and the vehicle speed Vel in turning the steering wheel, and it is possible to make a driver feel a pseudo road-surface reaction force without feeling the viscous feeling because the steering speed ω is not related to the compensation quantity.

Moreover, in FIG. 4 the deviation "−ωe" is inputted into the PI-control calculating section 110 after multiplied with the sign SN in the multiplying section 106, but it is also possible to provide an output section of the PI-control calculating section 110 with a multiplying section 109 as shown at a broken line in FIG. 4, at the same time input directly the deviation "−ωe" into the PI-control calculating section 110, multiply the return control gain Gr from the PI-control calculating section 110 with the sign SN in the multiplying section 109 and input into the limiter 108.

FIGS. 10 to 13 show other configuration examples of the return control gain calculating section in the steering wheel return control section 100 as corresponding to FIG. 4. Hereinafter, each embodiment will be described.

Figure 10:
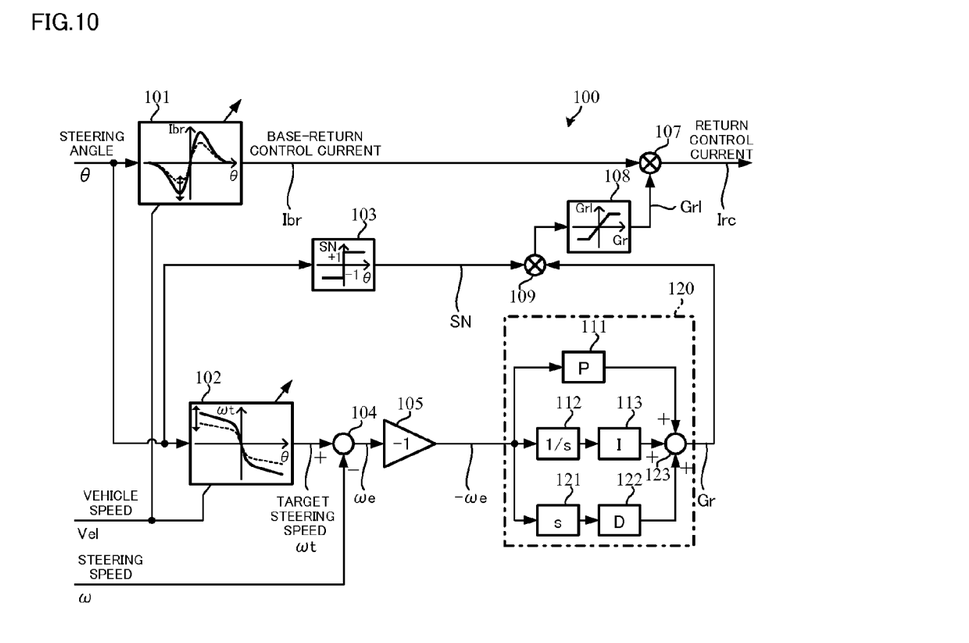
FIG. 10 is a block diagram showing another configuration example of the steering wheel return control section.

The embodiment shown in FIG. 10 produces a PID-control calculating section 120 by adding a differential (D) control calculation to a configuration of the PI-control calculating section 110 shown in FIG. 4, eliminates the multiplying section 106, and provides an output section of the PID-control calculating section 120 with the multiplying section 109 that multiplies the sign SN instead. That is, a differential (D) calculating section 121 that differential-calculates the steering speed ωc and a differential gain section 122 that multiplies an output of the differential calculating section 121 with a differential gain D are provided as a D-control calculation, an adding section 123 adds the output of the differential gain section 122, the output of the proportional calculating section 111 and the output of the integral gain section 113, and outputs the return control gain Gr. Then the multiplying section 109 multiplies the return control gain Gr with the sign SN and inputs into the limiter 108.

In this embodiment, the return control gain calculating section comprises the coding section 103, the subtracting section 104, the inverting section 105, the multiplying section 109 and the PID-control calculating section 120.

In this embodiment, because the differential (D) control enables a control gain to change in accordance with a change quantity of a deviation, the return control gain increases in the case that the change quantity of a deviation is large. Accordingly, it is possible to improve a control quick-responsibility to a target steering speed by adding the differential (D) control.

Figure 11:
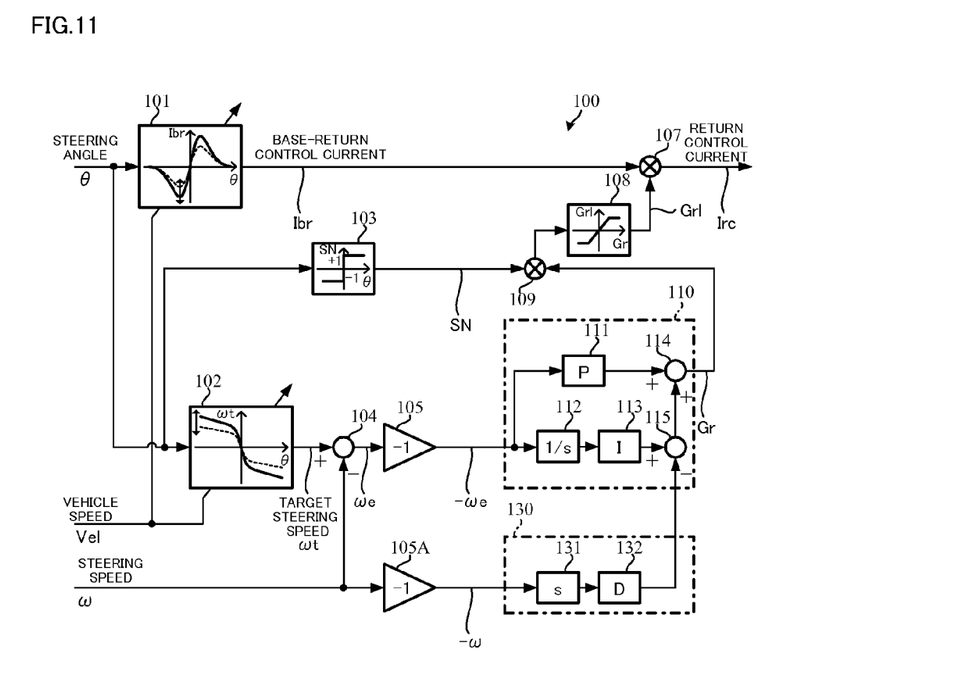
FIG. 11 is a block diagram showing further another configuration example of the steering wheel return control section.

The embodiment shown in FIG. 11 produces a PI-D-control calculating section by adding a D-preceding-control calculation to the PI-control calculation, comprises the PI-control calculating section 110 and a D-control calculating section 130 as a control calculating section, and provides an output section of the PI-control calculating section 110 with the multiplying section 109. Further, the inverting section 105 that inverts the steering speed ω is provided, the inverted steering speed −ω is differential-calculated in a differential calculating section 131 in the D-control calculating section 130, moreover, multiplied the differential gain D in a differential gain section 132, and the result is subtraction-inputted into a subtracting section 115 in the PI-control calculating section 110. A result of integral calculation is addition-inputted in the subtracting section 115, the difference is added a result of proportional calculation in the adding section 114, which outputs the return control gain Gr. The return control gain Gr is multiplied with the sign SN in the multiplying section 109, and inputted into the limiter 108.

In this embodiment, the return control gain calculating section comprises the coding section 103, the subtracting section 104, the inverting section 105 and 105A, the multiplying section 109, the PID-control calculating section 110 and D-control calculating section 130.

The differential preceding PID-control according to this embodiment uses not a deviation but a steering speed as an input signal of the differential (D) control so that an output of the differential (D) control fluctuates even if the target steering speed changes suddenly and so as to prevent the return control gain from changing suddenly, and at the same time smooth steering wheel return control is enabled because of exerting the differential (D) control for change of a steering speed by disturbance.

Figure 12:
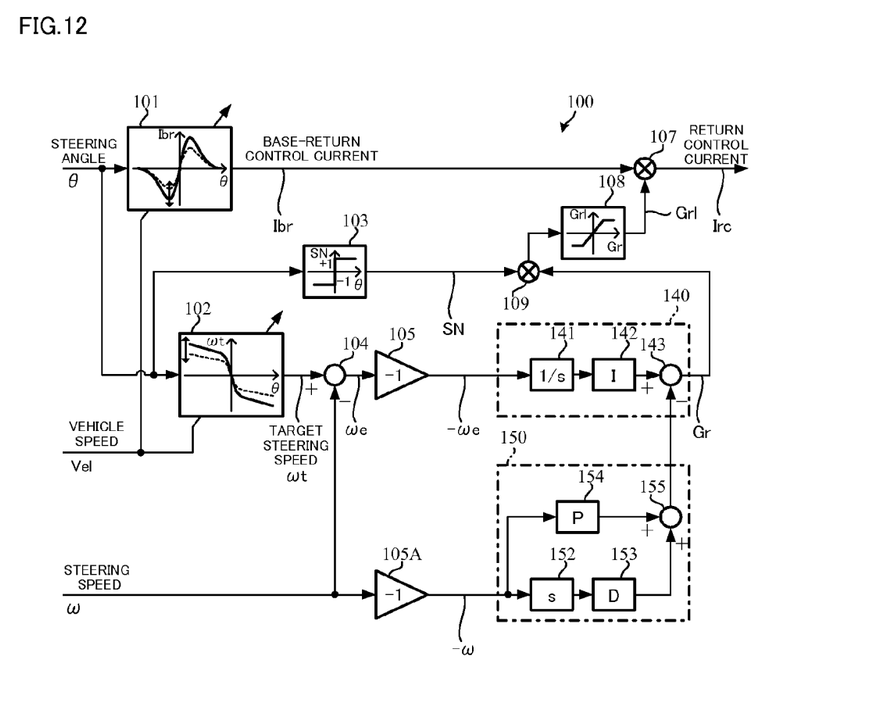
FIG. 12 is a block diagram showing further another configuration example of the steering wheel return control section.

The embodiment shown in FIG. 12 produces an I-PD-control calculating section by adding a PD-preceding-control calculation to the I-control calculation, and provides an I-control calculating section 140 and a PD-control calculating section 150 as a control calculating section. Further, as with the embodiment in FIG. 11, the inverting section 105A is provided, a proportion calculating section 154 in the PD-control calculating section 150 P-control-calculates the inverted steering speed −ω, which is differential-calculated in a differential calculating section 152 at the same time, moreover, is multiplied with the differential gain D in a differential gain section 153, and an adding section 155 adds the result of the proportional calculation and the result of the differential calculation. The addition result of the adding section 155 is subtraction-inputted into a subtracting section 143 in the I-control calculating section 140. Further, the steering speed −ωe from the inverting section 105 is integral-calculated in an integral calculating section 141 within the I-control calculating section 140, moreover, is multiplied with the integral gain I in an integral gain section 142, and is addition-inputted into the subtracting section 143. The subtracting section 143 subtracts the result of the PD-control calculating section 150 from the result of integral calculation at the I-control calculating section 140 and outputs the return control gain Gr. The return control gain Gr is multiplied with the sign SN in the multiplying section 109 and is inputted into the limiter 108.

In this embodiment, the return control gain calculating section comprises the coding section 103, the subtracting section 104, the inverting section 105 and 105A, the multiplying section 109, the I-control calculating section 140 and the PD-control calculating section 150.

The proportional differential-preceding PID-control according to the above embodiment uses not a deviation but a steering speed as an input signal of the differential (D) control so that each output of the proportional (P) control and the differential (D) control fluctuates even if the target steering speed changes suddenly and so as to prevent the return control gain from changing suddenly, and at the same time the smooth steering wheel return control is enabled because of exerting the proportional (P) control and the differential (D) control for change of a steering speed by disturbance.

Figure 13:
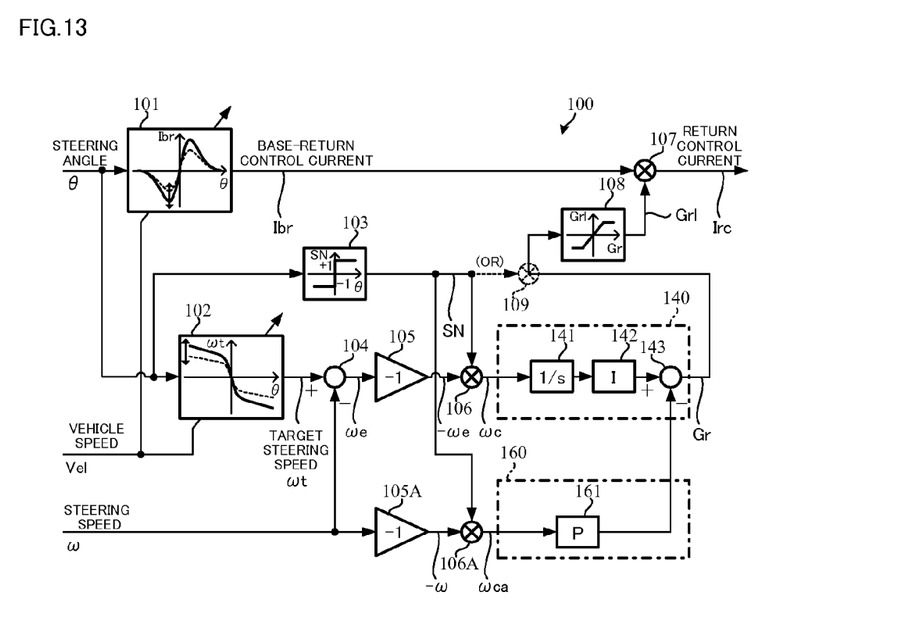
FIG. 13 is a block diagram showing further another configuration example of the steering wheel return control section.

The embodiment shown in FIG. 13 produces an I-P-control calculating section by adding a P-preceding-control calculation to the I-control calculation, and provides the I-control calculating section 140 and a P-control calculating section 160 as a control calculating section. As with the embodiment in FIG. 11, the inverting section 105A and a multiplying section 106A are provided, a proportional calculating section 161 in the P-control calculating section 160 proportional-calculates the multiplication result of the multiplying section 106A, which is subtraction-inputted into the subtracting section 143 in the I-control calculating section 140. Further, the steering speed ωc is integral-calculated in the integral calculating section 141 within the I-control calculating section 140, moreover, is multiplied with the integral gain I in the integral gain section 142, and is addition-inputted into the subtracting section 143. The subtracting section 143 subtracts the result of the PD-control calculating section 150 from the result of the integral calculation in the I-control calculating section 140 and outputs the return control gain Gr.

Moreover, in FIG. 13 the deviation "−ωe" is inputted into the I-control calculating section 140 after multiplied with the sign SN in the multiplying section 106, and at the same time the steering speed "−ω" is inputted into the P-control calculating section 160 after multiplied with the sign SN in the multiplying section 106A, but it is also possible to provide an output section of the I-control calculating section 140 with the multiplying section 109 as shown at a broken line in FIG. 13, at the same time input directly the deviation "−ωe" into the I-control calculating section 140, at the same time input directly the steering speed "−ω" into the P-control calculating section 160, multiply the return control gain Gr from the I-control calculating section 140 with the sign SN in the multiplying section 109 and input into the limiter 108.

In this embodiment, the return control gain calculating section comprises the coding section 103, the subtracting section 104, the inverting section 105 and 105A, the multiplying section 106 and 106A (or 109), the I-control calculating section 140 and P-control calculating section 160.

The proportional-preceding PI-control according to this embodiment does not have the differential (D) control so as to enable a control logic to be simplified, at the same time uses not a deviation but a steering speed as an input signal of the proportional (P) control so that an output of the proportional (P) control fluctuates even if the target steering speed changes suddenly and so as to prevent the return control gain from changing suddenly, and the smooth steering wheel return control is enabled because of exerting the proportional (P) control for change of a steering speed by disturbance.

EXPLANATION OF REFERENCE NUMERALS 1 steering handle (steering wheel)
2 column shaft (steering shaft, steering wheel shaft)
3 reduction gears
10 torque sensor
11 ignition key
12 vehicle speed sensor
13 battery
15 steering angle sensor
20 motor
30 control unit (ECU)
100 steering wheel return control section
101 base-return control current calculating section
102 target steering speed calculating section
103 coding section
105, 105A inverting section
108 limiter
110 PI-control calculating section
120 PID-control calculating section
130 D-control calculating section
140 I-control calculating section
150 PD-control calculating section
160 P-control calculating section
180 steering speed calculating section

The invention claimed is:

1. An electric power steering apparatus that calculates a current command value based on a steering torque and a vehicle speed, drives a motor based on said current command value, and performs assist control of a steering system by drive-control of said motor, comprising:
a steering wheel return control section that calculates a return control current with a steering angle, said vehicle speed and a steering speed,
wherein said electric power steering apparatus drives said motor with a compensated current command value left by the subtraction of said return control current from said current command value, and
wherein said steering wheel return section comprises a base-return control current calculating section that calculates a base-return control current based on said steering angle and said vehicle speed, a target steering speed calculating section that calculates a target steering speed based on said steering angle and said vehicle speed, a return control gain calculating section that calculates a deviation between said target steering speed and said steering speed, performs coding, and calculates a return control gain using by at least two control calculations among a P-control calculation, an I-control calculation and a D-control calculation, a limiter that limits a maximum value of said return control gain, and a correcting section that corrects said base-return control current with an output gain of said limiter and outputs said return control current.

2. The electric power steering apparatus according to claim 1, wherein
said return control gain calculating section comprises a subtracting section that calculates a deviation between said target steering speed and said steering speed, an inverting section that inverts said deviation, a coding section that obtains a positive or negative sign of said steering angle, a multiplying section that multiplies an inverted deviation from said inverting section with said sign, and a control calculating section that outputs said return control gain by performing the P-control calculation and the I-control calculation of an output from said multiplying section and adding an output of the P-control calculation and an output of the I-control calculation.

3. The electric power steering apparatus according to claim 1, wherein
said return control gain calculating section comprises a subtracting section that calculates a deviation between said target steering speed and said steering speed, an inverting section that inverts said deviation, a coding section that obtains a positive or negative sign of said steering angle, a control calculating section that outputs said return control gain by performing the P-control calculation and the I-control calculation of an output from said inverting section and adding an output of the P-control calculation and an output of the I-control calculation, and a multiplying section that multiplies said return control gain with said sign.

4. The electric power steering apparatus according to claim 1, wherein
said return control gain calculating section comprises a subtracting section that calculates a deviation between said target steering speed and said steering speed, an inverting section that inverts said deviation, a coding section that obtains a positive or negative sign of said steering angle, a control calculating section that outputs said return control gain by performing the P-control calculation, the I-control calculation and a D-control calculation of an output from said inverting section and adding an output of the P-control calculation, an output of the I-control and an output of the D-control calculation, and a multiplying section that multiplies said return control gain with said sign.

5. The electric power steering apparatus according to claim 1, wherein
said return control gain calculating section comprises a subtracting section that calculates a deviation between said target steering speed and said steering speed, a first inverting section that inverts said deviation, a coding section that obtains a positive or negative sign of said steering angle, a second inverting section that inverts said steering speed, a control calculating section that outputs said return control gain by performing the P-control calculation and the I-control calculation of an output from said first inverting section, performing the D-control calculation of an output from said second inverting section, subtracting an output of said D-control calculation from an output of said I-control calculation and adding an output of said P-control to a result of a subtraction, and a multiplying section that multiplies said return control gain with said sign.

6. The electric power steering apparatus according to claim 1, wherein
said return control gain calculating section comprises a subtracting section that calculates a deviation between said target steering speed and said steering speed, a first inverting section that inverts said deviation, a coding section that obtains a positive or negative sign of said steering angle, a second inverting section that inverts said steering speed, a control calculating section that outputs said return control gain by performing the I-control calculation of an output from said first inverting section, performing the P-control calculation and the D-control calculation of an output from said second inverting section and subtracting an addition result of an output of said P-control calculation and an output of said D-control calculation from an output of said I-control, and a multiplying section that multiplies said return control gain with said sign.

7. The electric power steering apparatus according to claim 1, wherein
said return control gain calculating section comprises a subtracting section that calculates a deviation between said target steering speed and said steering speed, a first inverting section that inverts said deviation, a coding section that obtains a positive or negative sign of said steering angle, a first multiplying section that multiplies an inverted deviation from said first inverting section with said sign, a second inverting section that inverts said steering speed, a second multiplying section that multiplies an inverted steering speed from said second inverting section with said positive or negative sign, and a control calculating section that outputs said return control gain by performing the I-control calculation of an output from said first multiplying section, performing the P-control calculation of an output from said second multiplying section and subtracting an output of said P-control calculation from an output of said I-control calculation.

8. The electric power steering apparatus according to claim 1, wherein
said return control gain calculating section comprises a subtracting section that calculates a deviation between said target steering speed and said steering speed, a first inverting section that inverts said deviation, a coding section that obtains a positive or negative sign of said steering angle, a second inverting section that inverts said steering speed, a control calculating section that outputs said return control gain by performing the I-control calculation of an output from said first inverting section, performing the P-control calculation of an output from said second inverting section, subtracting an output of said P-control calculation from an output of said I-control calculation, and a multiplying section that multiplies said return control gain with said sign.

9. The electric power steering apparatus according to claim 1, wherein
said maximum value is 1.0, and said correcting section is a multiplying section.

10. The electric power steering apparatus according to claim 2, wherein
said maximum value is 1.0, and said correcting section is a multiplying section.

11. The electric power steering apparatus according to claim 1, wherein
said base-return control current calculating section is a vehicle-speed sensitive type, and has a parabolic characteristic of point symmetry that the base-return control current gradually increases in positive and negative directions as an absolute value of said steering angle increases from 0, and the base-return control current gradually decreases after said absolute value exceeds a predetermined value.

12. The electric power steering apparatus according to claim 2, wherein
said base-return control current calculating section is a vehicle-speed sensitive type, and has a parabolic characteristic of point symmetry that the base-return control current gradually increases in positive and negative directions as an absolute value of said steering angle increases from 0, and the base-return control current gradually decreases after said absolute value exceeds a predetermined value.

13. The electric power steering apparatus according to claim 9, wherein
said base-return control current calculating section is a vehicle-speed sensitive type, and has a parabolic characteristic of point symmetry that the base-return control current gradually increases in positive and negative directions as an absolute value of said steering angle increases from 0, and the base-return control current gradually decreases after said absolute value exceeds a predetermined value.

14. The electric power steering apparatus according to claim 1, wherein
said target steering speed calculating section is a vehicle-speed sensitive type, and has a characteristic of point symmetry that the target steering speed gradually increases in negative and positive directions as an absolute value of said steering angle increases from 0.

15. The electric power steering apparatus according to claim 2, wherein
said target steering speed calculating section is a vehicle-speed sensitive type, and has a characteristic of point symmetry that the target steering speed gradually increases in negative and positive directions as an absolute value of said steering angle increases from 0.

16. The electric power steering apparatus according to claim 9, wherein
said target steering speed calculating section is a vehicle-speed sensitive type, and has a characteristic of point symmetry that the target steering speed gradually increases in negative and positive directions as an absolute value of said steering angle increases from 0.

17. The electric power steering apparatus according to claim 11, wherein
said target steering speed calculating section is a vehicle-speed sensitive type, and has a characteristic of point symmetry that the target steering speed gradually increases in negative and positive directions as an absolute value of said steering angle increases from 0.

* * * * *